Figure 3:
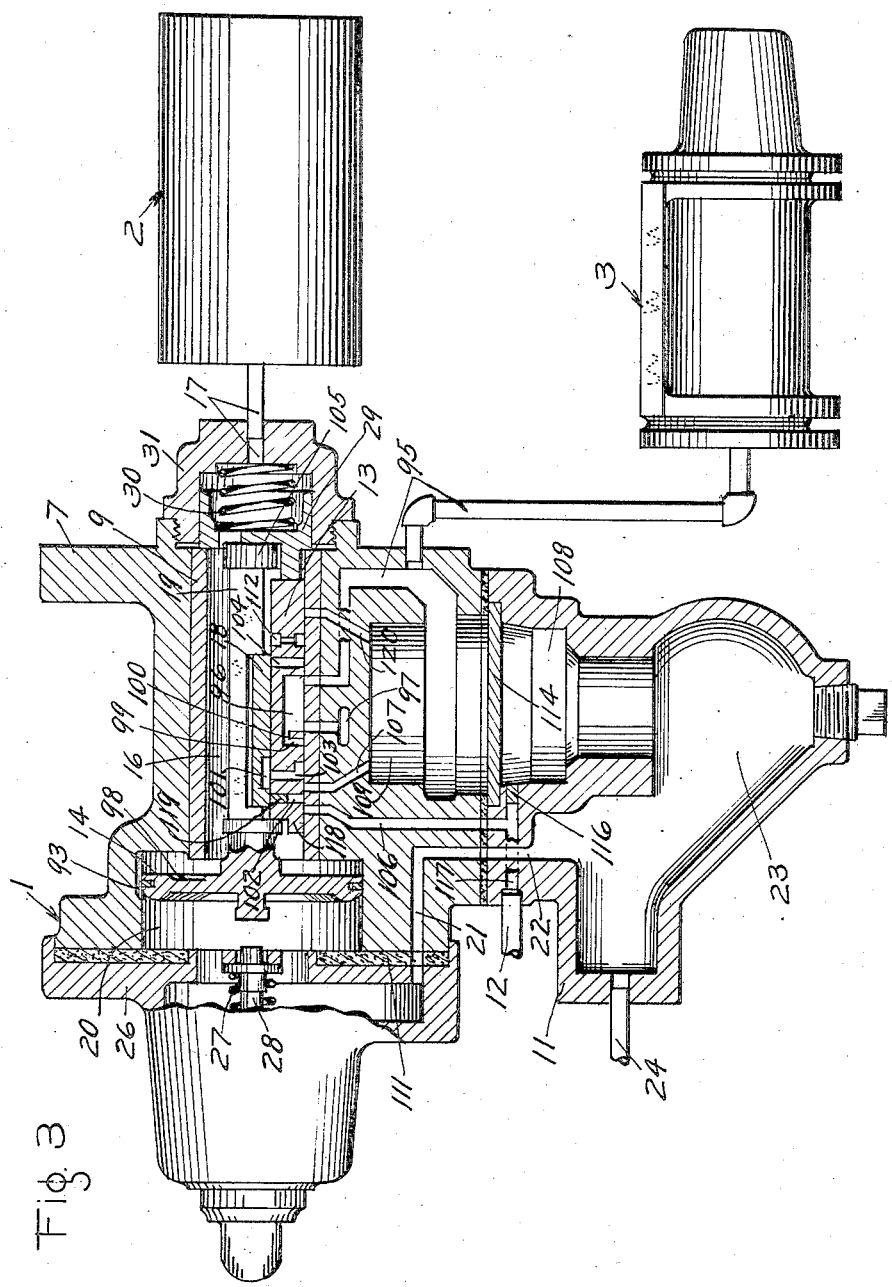

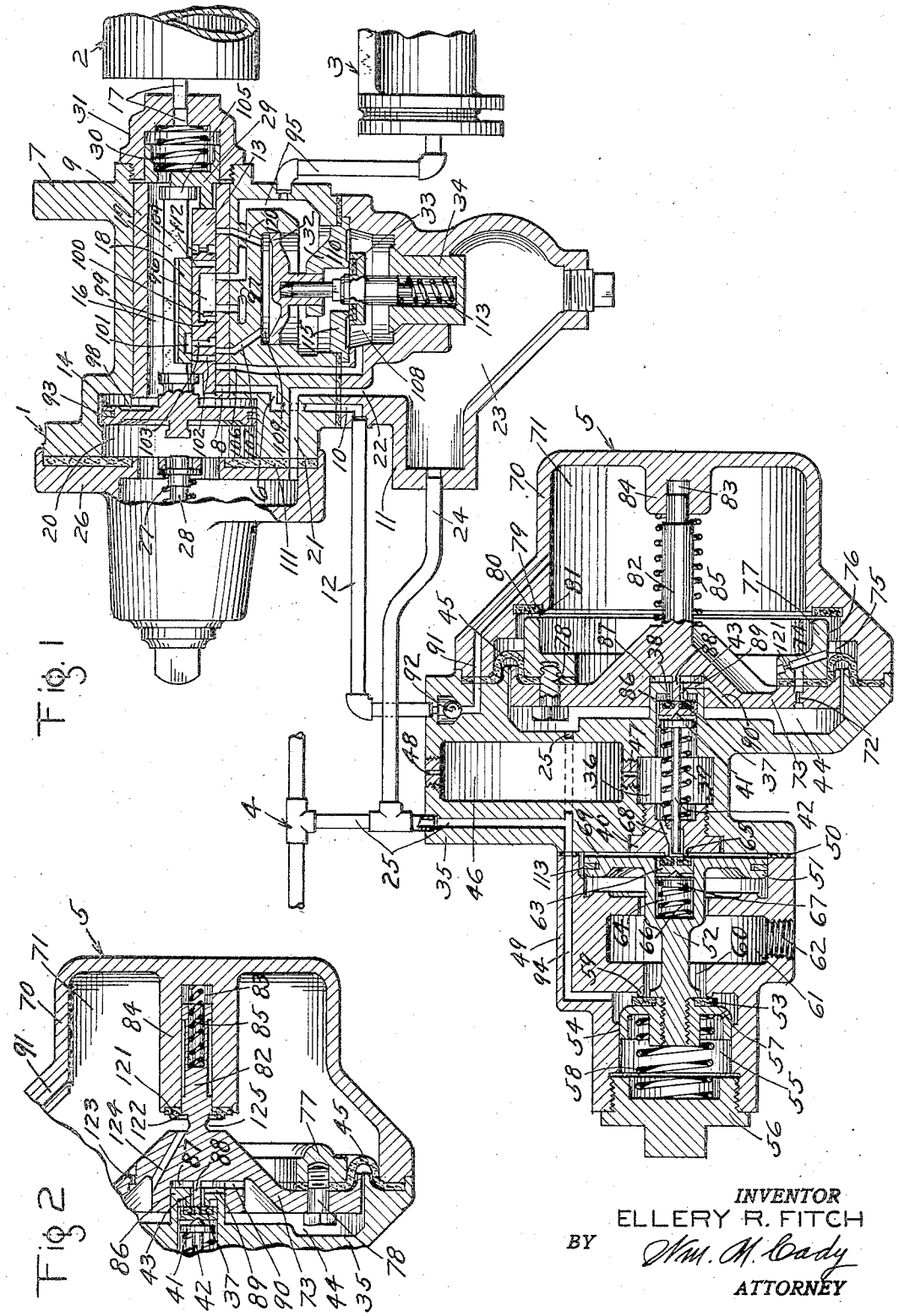

Oct. 8, 1935.  E. R. FITCH  2,016,409
FLUID PRESSURE BRAKE
Filed Nov. 25, 1932   2 Sheets-Sheet 2

INVENTOR
ELLERY R. FITCH
BY
ATTORNEY

Patented Oct. 8, 1935

2,016,409

UNITED STATES PATENT OFFICE 2,016,409

FLUID PRESSURE BRAKE

Ellery R. Fitch, Edgewood, Pa., assignor to The Westinghouse Air Brake Company, Wilmerding, Pa., a corporation of Pennsylvania Application November 25, 1932, Serial No. 644,265

11 Claims. (Cl. 303—38)

This invention relates to automatic fluid pressure brake systems in which the brakes are applied by effecting a reduction in brake pipe pressure, and more particularly to systems of the type shown in the Patent 1,974,754 of Earle S. Cook and the applicant, filed September 27, 1931, Patent 1,943,593 of the applicant, filed July 29, 1932, and Patent 1,980,322 of Earle S. Cook, filed July 23, 1932, all of which patents are assigned to the assignee of this application.

In the handling of long trains, it is highly desirable to apply the brakes on cars at the rear end of the train as nearly as possible in synchronism with the application of the brakes on the cars at the head end of the train, so as to prevent slack in the train from running in at such a rate as to cause excessive and damaging shocks.

According to each of the above mentioned applications, in order to accomplish this result, a fluid pressure brake system is provided which embodies means located on the locomotive for effecting successive reductions in brake pipe pressure and which embodies sensitive and yet stable means located on the cars of the train which are responsive to each reduction in brake pipe pressure, effected through the operation of the means on the locomotive, for effecting successive limited local reductions in brake pipe pressure.

The present invention is principally concerned with the local venting of fluid under pressure from the brake pipe on the cars of the train and more particularly with the means for controlling the local venting of fluid and has for its principal object the provision of an improved sensitive and stable valve mechanism on the cars of the train, which is responsive to successive reductions in brake pipe pressure effected by either manually or automatically operated means on the locomotive for positively effecting successive limited local reductions in brake pipe pressure, and which is also quickly responsive to sudden reductions in brake pipe pressure to effect a sudden local venting of brake pipe pressure for effecting an emergency application of the brakes.

Other objects and advantages will appear in the following more detailed description of the invention.

In the accompanying drawings, Fig. 1 is a diagrammatic view of a fluid pressure brake equipment for a car and embodying my invention; and Fig. 2 is a fragmentary sectional view of a modification of my invention.

As shown in Fig. 1 of the drawings, the fluid pressure brake equipment may comprise a brake controlling valve device, such as a triple valve device 1, an auxiliary reservoir 2, a brake cylinder 3, a brake pipe 4 and a combined quick service and quick action brake pipe vent valve device 5.

The triple valve device 1 may be of any desired type, but for illustrative purposes only, I have shown a triple valve device of the well known K type, which has been slightly modified to adapt the same for use in connection with my improved equipment. The modification consists in providing a new passage 6 in the triple valve casing 7 registering at one end with a new port 8 in the main slide valve bushing 9 and at the other end with a new passage 10, preferably in the check valve casing 11, the other end of the passage 10 being connected to a pipe 12 leading to the combined quick service and quick action vent valve device. The port 8 is so disposed that it will be uncovered by the main slide valve 13 when said valve is in retarded release position, for a purpose which will be described hereinafter.

The old triple valve piston 14, the main slide valve 13 and the graduating slide valve 18 are used without change and are contained in the valve chamber 16 which is open, though a pipe 17, to the auxiliary reservoir 2. The chamber 20, at one side of the piston 14, is open, in the usual manner, to the brake pipe 4 through the passages 21 and 22, the chamber 23 in the check valve casing 11 and the branch pipes 24 and 25.

The old piston chamber cap 26, carrying the graduating spring 27 and stop 28, is used without change and is secured in its original position to the casing 7, in the usual manner.

The retarded release stop 29 and retarded release spring 30 are used without change and are contained in the old cage member 31, which has screw-threaded connection with the triple valve casing 7.

The emergency piston 32, for operating the brake pipe vent valve 33, and the check valve 34 are used without change.

The triple valve device is operated in the usual manner upon a reduction in pressure in the brake pipe 4 to effect an application of the brakes and upon an increase in brake pipe pressure to effect the release of the brakes.

For controlling the local quick service and local quick action venting of brake pipe pressure, I provide a combined quick service and quick action vent valve device 5, which comprises a pipe bracket 35 having a chamber 36 which contains at one end a quick service vent valve 37 normally held seated on a seat rib 38, which may be provided in a projecting portion 86 on the pipe bracket 35, by the pressure of a coil spring 39 interposed between and engaging a nut 40 having screw-threaded connection with the pipe bracket 35 at one end of the chamber 36 and a flange 41 formed on a stem 42, which engages at one end the valve 37 and which has its opposite end slidably guided within the nut 40.

The valve 37 is adapted to control communication, through a passage 43, from a chamber 44 at one side of a diaphragm 45, which will be referred to hereinafter, to the chamber 36.

A quick service chamber 46, preferably contained in the pipe bracket 35, is in constant communication with the chamber 36 through a restricted passage 47 and is in constant communication with the atmosphere through a restricted port 48, so that fluid can vent from said reservoir at all times at a rate as determined by the flow area of the port 48.

Supported on one face of the pipe bracket 35 is a quick action vent valve mechanism which comprises a casing 49, a gasket 50 being interposed between said casing and the pipe bracket. Contained in the casing 49 is a piston 51 having a stem 52 carrying a vent valve 53 which is secured to the stem by a guide member 54 having screw-threaded connection with the stem, said member slidably engaging the casing 49 within a chamber 55. The open end of the chamber 55 is closed by a cap nut 56 having screw-threaded connection with the casing 49.

The portion of the vent valve chamber 55 at the left of the valve 59 is open to the brake pipe through an opening 57 in the guide member 54, a passage 94, and passage and pipe 25, and contains a spring 58 which is interposed between and engages the cap nut 56 and which acts, through the medium of the guide member, to normally maintain the vent valve 53 seated on an annular seat rib 59 formed on the casing 49, so as to normally maintain closed a communication from the valve chamber 55, and consequently from the brake pipe passages 25 and 94, to a passage 60 leading to the atmosphere by way of a chamber 61 at one side of the vent valve piston 51 and a passage 62.

A valve 63 is slidably guided within a central bore 64 in the piston stem 52 and is normally held seated on an annular seat rib 65, carried by the nut 40, by a spring 66 acting through the medium of a follower 67, the spring and follower being contained in the bore 64. The valve 63 is adapted to be unseated through the medium of the stem 42, as will be explained hereinafter.

The valve 63 controls communication between a passage 68 in the nut 40 and leading to the chamber 36 and the vent valve piston chamber 69.

For controlling the operation of the valves 37 and 63, I provide a movable abutment which may be in the form of a flexible diaphragm 45 clamped between the pipe bracket 35 and a casing 70 and having at one side a chamber 71 and at the other side a chamber 44 to which the brake pipe passage 25 leads and which is in communication with the chamber 71 through a restricted port 72 in a follower 73 at one side of the diaphragm 45 which connects, in the present embodiment of my invention, with a relatively large passage 74 in a plate 77 at the other side of said diaphragm, said passage being in constant communication with an annular chamber 75 adjacent to the peripheral face 76 of the plate 77 and also connecting with a restricted passage 121 in said plate in communication with the chamber 71.

The follower 73 and the plate 77 may be secured together by means of cap screws 78, only one of which is shown.

An annular sealing gasket 79 is provided in the casing 70, the annular face 80 of the plate 77 being normally spaced away from said gasket, permitting communication from the chamber 75 to the chamber 71 through the annular space 81 between the plate and the gasket. The gasket 79 is adapted to be engaged by the face 80 of the plate 77, so as to close off said communication.

The follower 77 is provided with a stem 82 which is slidably guided within a bore 83 in a guide projection 84 on the casing 70. Preferably interposed between and engaging the follower 73 and the guide projection 84 is a biasing spring 85, which acts to normally maintain the follower 73 in the position in which it is shown in the drawings.

In the present embodiment of the invention, the follower 73 is provided with a central bore 87 in which a projecting portion 86 on the pipe bracket 35 slidably engages. This engagement, in cooperation with the aforementioned means for guiding the stem 82, acts to support and guide the follower 73 and the diaphragm 45. In addition, the projecting portion 86 serves to limit the leftward travel of the diaphragm follower 73.

A stem 88 carried by the follower 73 extends through the passage 43 and is adapted to engage the valve 37 for unseating said valve.

The relation between the values of the springs 39 and 85 is such that the spring 39 will maintain the valve 37 seated against the action of the biasing spring 85.

It will be noted that, according to the construction, the passage 43 is normally in communication with the brake pipe chamber 44 through a groove 89 provided in the end of the projecting portion 86 in the pipe bracket, the bore 87 in the follower 73 and a passage 90 in the follower.

As hereinbefore stated, the valve 63 is adapted to be operated by the stem 42, which is in turn operated by the follower 73 through the medium of the valve 37. However, the end of the stem 42 is spaced slightly away from the valve 63 and since said valve is urged to its seat by the spring 66, said valve will not be unseated when the valve 37 is unseated, unless sufficient differential is created on opposite sides of the diaphragm 45 to overcome the resistance of the spring 66 in addition to that of the spring 39.

A passage 91, communicating with the chamber 71, is connected to the pipe 12 for permitting flow of fluid from said chamber to the valve chamber 16 when the main slide valve 13 is in retarded release position, for a purpose which will be hereinafter described. The passage 91 is provided with a check valve 92 for preventing back flow of fluid from the valve chamber 16 to the chamber 71.

The locomotive equipment has not been illustrated in the drawings, but it will be understood that this equipment may be substantially the same as that fully described in the aforementioned Patent No. 1,974,954, in which successive reductions in brake pipe pressure are effected automatically, or in the aforementioned pending application, Serial No. 624,247, in which the successive reductions in brake pipe pressure are controlled manually. In the following description of the operation of the equipment, it will be assumed that means are provided on the locomotive for effecting successive reductions in brake pipe pressure, such as that disclosed in the above first mentioned pending application.

In operation, when initially charging, the brake valve device is placed in release position, in which fluid under pressure is supplied from the main reservoir to the brake pipe in the usual well known manner and after a certain interval the brake valve device is moved to running position in which the pressure of the fluid supplied to the brake pipe is governed by the feed valve device.

Fluid under pressure thus supplied to the brake pipe flows therefrom to the triple valve piston chamber 20 by way of the pipes 25 and 24, chamber 23, and passages 22 and 21.

With the triple valve parts in normal release position as shown in the drawings, fluid under pressure supplied to the triple valve piston chamber 20 flows through a feed groove 93 around the piston 14 to the valve chamber 16 and from thence flows through passage and pipe 17 to the auxiliary reservoir 2, thereby charging the auxiliary reservoir to brake pipe pressure.

Further, with the triple valve parts in normal release position, the brake cylinder 3 is open to the atmosphere by way of a pipe and passage 95, a cavity 96 in the main slide valve 13 and the atmospheric port 97.

On the cars at the front end of the train, where the rate of increase in brake pipe pressure is at a relatively fast rate, the triple valve piston and slide valves do not remain in normal release position, but move farther rearwardly to retarded release position against the opposing pressure of the retarded release spring 30.

With the triple valve parts in retarded release position, the rear face of the triple valve piston 14 engages the bushing 9 and fluid under pressure flows from the triple valve piston chamber 20 to the valve chamber 16 and connected auxiliary reservoir 2 at a restricted rate through feed groove 93 and then through a smaller feed groove 98 formed in the triple valve piston. The brake cylinder passage 95 is open to the cavity 96 in the main slide valve 13, and a retarded release cavity 99, which is connected to the cavity 96 through a choked connection 100, is in registration with the atmospheric port 97.

Further, in retarded release position, the port 8, which opens into passage 6 which is connected to the chamber 71 through the passage 10, the pipe 12 and the passage 91, is uncovered by the main slide valve 13 for a purpose which will be explained hereinafter.

When, with the triple valve parts in retarded release position, the auxiliary reservoir pressure in valve chamber 16 is increased to substantially the pressure of fluid in the tripe valve piston chamber 20, the retarded release spring 30, acting through the medium of the retarded release stop 29 and piston stem 19, moves the triple valve piston 14 and slide valves 13 and 18 to normal release position.

From the pipe 25, fluid flows through the passage 94 to the quick action vent valve chamber 55. From the pipe 25, fluid under pressure also flows through the passage 25 to the diaphragm chamber 44 and from thence flows through the small port 72 in the diaphragm follower 73 into the passage 74 and then into the annular chamber 75 whence it flows through the space 81 between the plate 77 and the sealing gasket 79 into the chamber 71, charging said chamber to brake pipe pressure. The capacity of the restricted passage 72 is such that, on the cars at the rear end of the train where the increase in brake pipe pressure is at a relatively slow rate, sufficient differential will not be created on opposite sides of the diaphragm 45 to cause said diaphragm to be moved toward the right hand from the normal position, which is the position shown in the drawings.

On the cars at the head end of the train, where the increase in brake pipe pressure is at a relatively fast rate, a differential fluid pressure will be established on opposite sides of the diaphragm 45, due to the small capacity of the restricted port 72, and this will cause said diaphragm, and thereby the plate 77, to be moved to the right hand until the annular face 80 of said plate is in engagement with the sealing gasket 79. By reason of this engagement, communication from the chamber 75 to the chamber 71 is cut off, so that the flow of fluid under pressure from the passage 74 into the chamber 75 is not effective in increasing the pressure in the chamber 71. The charging of the chamber 71 is then effected through the two chokes 72 and 121 in series and this results in a relatively slow increase of pressure in chamber 71, which reduces the possibility of the chamber 71 being charged to a pressure greater than that normally carried in the brake pipe, which if permitted, would tend to cause the combined quick service and quick action mechanism to operate to effect an undesired emergency application of the brakes when the brake pipe pressure reduces to that normally carried upon the usual movement of the brake valve device from release to running position. Further protection against an overcharge of the chamber 71 is provided by reason of the fact that fluid under pressure in said chamber is free to equalize into the valve chamber 16 and the auxiliary reservoir 2 by way of passage 91, past the check valve 92, through the pipe 12, and the passages 10 and 6 and the port 8 in the main slide valve bushing 9 of the triple valve device, the main slide valve 13 being in retarded release position, as hereinbefore mentioned.

If, on the other hand, the auxiliary reservoir should charge faster than chamber 71, then the check valve 92, by preventing flow of fluid from the valve chamber 16 to the chamber 71, will prevent overcharge of chamber 71.

It will be noted, that when the plate 77 is in engagement with the sealing gasket 79, the chamber 75 is charged with fluid from the passage 74 and this reduces the liability of damage or rupture of the diaphragm 45 due to the pressure of the fluid in the chamber 44.

When, with the plate 77 in engagement with the gasket 79, the pressure in chamber 71 is increased to substantially the pressure of the fluid in the chamber 44, the spring 85 moves the follower 73 to the left hand to the normal position as shown in Fig. 1.

In order to effect a service application of the brakes, a series of light reductions in brake pipe pressure is effected by the operation of suitable means (not shown) carried by the locomotive, such for instance as the apparatus fully described in the aforementioned Patent No. 1,974,954.

The initial reduction in brake pipe pressure, produced by the apparatus on the locomotive, causes a corresponding reduction in fluid pressure in the chamber 44, at one side of the diaphragm 45, through passage and pipe 25. The pressure in chamber 71 can reduce only by flow through the small port 72, which is of such a flow area that the pressure in said chamber reduces at a slower rate than the pressure in chamber 44, and a fluid pressure differential is thus established on opposite sides of the diaphragm 45, which will cause said diaphragm to move to the left hand. As the diaphragm thus moves, the stem 88 unseats the valve 37 against the opposing pressure of the spring 39 acting through the medium of the flange 41 carried by the stem 42. It will here be noted that as the valve 37 is unseated, it is slidably guided within one end of the chamber 36.

When the valve 37 is thus unseated, fluid is vented from the chamber 44 to the quick service chamber 46 through passage 90 in the follower 73, chamber 87, passage 43, chamber 36 and the restricted opening 47, the flow area of said restricted opening being such as to permit a rapid venting of fluid under pressure from the chamber 44 into the quick service chamber. Since the brake pipe is in communication with chamber 44 through the pipe and passage 25, the venting of chamber 44 causes a local venting of fluid from the brake pipe and this venting is effected serially on the cars of the train from the front to the rear.

Due to the large diameter of the diaphragm 45 in proportion to the weight of the follower 73 and the plate 77 and due to the short movement required to unseat the quick service vent valve 37, the diaphragm will operate when only a light differential of pressures has been created between the chambers 44 and 71, so that a local reduction in brake pipe pressure is produced very quickly in response to the reduction in brake pipe pressure.

On the other hand, by properly proportioning the flow area of the port 72, the diaphragm 45 can be made responsive to vent fluid under pressure from the brake pipe only when the rate of reduction in brake pipe pressure is such as to cause the necessary differential pressure to be created.

As a consequence, the diaphragm 45 is rendered stable in that it is not responsive to fluctuations in brake pipe pressure due to leakage from the brake pipe and to slight variations in brake pipe pressure due to variations in the operation of the usual feed valve device. In other words, the diaphragm 45 is responsive and only responsive when the reduction in brake pipe pressure is at a predetermined rate.

It should be noted that the unseating of the valve 37 causes the stem 42 to engage the valve 63, but that the valve 63 will remain seated because the differential created on opposite sides of the diaphragm 45, when brake pipe pressure is reduced at a service rate, is not sufficient to unseat the valve 63 against the resistance of the spring 66.

As soon as the rate of reduction in brake pipe pressure becomes less than the rate required to maintain the pressure differential necessary to hold the diaphragm 45 in its quick service venting position, the spring 39 acts, through the medium of the flange 41, on the stem 39, the valve 37 and the stem portion 88 of the follower 73, to move the diaphragm 45 toward the right hand until the valve 37 engages the seat rib 38 and thereby cuts off further venting of fluid from the brake pipe.

The successive waves of reduction in brake pipe pressure, produced by the operation of the apparatus on the locomotive, cause corresponding successive operations of the diaphragm 45 and valve 37, so that a succession of local reductions in brake pipe pressure is produced on each car of the train.

When the valve 37 seats on the seat rib 38, the fluid in the quick service chamber 46 is vented to the atmosphere at a rate as permitted by the restricted port 48, so that the pressure in said chamber is reduced to provide for a further reduction in brake pipe pressure when the diaphragm 45 operates at each successive reduction in brake pipe pressure to unseat the valve 37 and thereby open communication from the brake pipe to the quick service chamber.

The volume of the chamber 46 is made such as to give the desired brake pipe reduction, taking into consideration the volume of the brake pipe on the car.

The flow capacity of the restricted port 48 may be such that the quick service chamber 46 will not be completely vented between successive operations of the diaphragm 45. In this event, the succeeding local reductions in brake pipe pressure will be less in degree than the initial local reduction, it being desirable to provide a slightly heavier initial reduction in order to compensate for the displacement of the brake cylinder piston.

The venting of fluid from the brake pipe in the manner described, causes a venting of fluid from the triple valve piston chamber 20 through the passages 21 and 22, chamber 23, pipe 24, and pipe and passage 25. When the pressure of fluid in the piston chamber 20 is thus reduced slightly below auxiliary reservoir pressure in valve chamber 16, fluid under pressure in said valve chamber causes the piston to move outwardly, that is, toward the left hand, first closing the feed groove 93 around the piston and shifting the graduating valve 18 relative to the main slide valve 13, so that the cavity 101 in the graduating valve connects the ports 102 and 103 in the main slide valve 13 and so that the service port 104 in the main slide valve is uncovered. Further, movement of the piston causes a collar 105, at the rear end of the piston stem 19, to operatively engage the rear end of the main slide valve 13, and as the piston continues to move toward the left hand, both the main slide valve 13 and the graduating valve 18 are caused to move in unison to the usual quick service position, in which communication from the brake cylinder passage 95 to the atmospheric port 97 is cut off and in which the passage 102 in the main slide valve registers with the passage 106, which connects with the chamber 108 above the check valve 34. Further, in this position the passage 103 in the main slide valve registers with the passage 107 leading to the chamber 109 above the emergency piston 32. Fluid under pressure is now locally vented from the brake pipe to the brake cylinder, in the usual well known manner, by way of pipes 25 and 24, chamber 23, past the check valve 34, then through chamber 108, passage 106, passage 102 in the main slide valve 13, cavity 101 in the graduating valve 18, passage 103 in the main slide valve, and passage 107 to chamber 109. The piston 32 is a loose fit in its cylinder, so that fluid flows around the piston to chamber 110 which is open to the brake cylinder 3.

The quick service local reduction in brake pipe pressure effected by the triple valve device acts to hasten the initial quick service reduction in brake pipe pressure effected by the combined quick service and quick action vent valve device 5.

The local reduction in brake pipe pressure, effected by the operation of the combined quick service and quick action vent valve device and by the operation of the triple valve device, acts to hasten the movement of the triple valve parts on the next car in the train to quick service position. The combined quick service and quick action vent valve device and the triple valve device on said next car then function in a similar manner, and in this way a quick response to the brake pipe reduction is transmitted serially throughout the length of the train.

With the main slide valve 13 in quick service position, the service port 104 in said slide valve is in partial registration with the brake cylinder passage 95, so that fluid will flow, in the usual manner, at a slow rate from the valve chamber 16 and connected auxiliary reservoir 2 to the brake cylinder through the service port 104 and passage and pipe 95.

With the triple valve parts in quick service position, the piston 14 engages the stop 28, after which the further forward movement of the piston and slide valves toward full service position is yieldably resisted by the graduating spring 27.

When the brake pipe pressure in the triple valve piston chamber 20 is reduced, by the aforementioned local venting of brake pipe pressure, sufficiently below the auxiliary reservoir pressure in the valve chamber 16, that the pressure differential created on the piston 14 is great enough to overcome the resistance offered by the piston and main slide valve 13 to movement in addition to the resistance of the graduating spring 27, the piston will move outwardly to full service position, carrying the slide valves with it.

The main slide valve 13, in its traverse from quick service to full service position, closes communication from the brake pipe to the brake cylinder by lapping the passage 106, thereby preventing further quick service venting of fluid under pressure from the brake pipe to the brake cylinder.

In the full service position of the main slide valve, the service port 104 is fully open to the brake cylinder passage 95, so that fluid under pressure will continue to flow from the valve chamber 16 to the brake cylinder 3, but at a more rapid rate than in quick service position.

It will here be noted that the check valve 92 in the passage 91 prevents back flow of fluid from the chamber 16 and connected auxiliary reservoir to the chamber 71 through the port 8, passages 6 and 10, pipe 12 and passage 91, in the event of the triple valve parts being in retarded release position when the brake pipe pressure is being reduced to effect a service application of the brakes. If it were not for the check valve, there would be an open communication through which fluid would flow from the chamber 16 and auxiliary reservoir to the chamber 71 when the triple valve parts are in retarded release position and a service reduction in brake pipe pressure is effected. With the volumes of the auxiliary reservoir 3 and valve chamber 16 added to that of chamber 71, the port 72 in the diaphragm follower 73 would not permit fluid under pressure to flow from the chamber 71 to the brake pipe sufficiently fast to prevent fluid under pressure in said chamber 71 from causing the diaphragm 45 from moving from the position in which it is shown in the drawings to emergency position, which will be described hereinafter. Consequently, an undesired emergency application of the brakes would be effected. By the use of the check valve 92, this undesired operation of the combined quick service and quick action vent valve mechanism is prevented.

It will also be noted that the port 8 is lapped by the main slide valve 13 when said slide valve is in normal release position, as shown in the drawings. Thus, in this position, increased protection is provided against leakage from the valve chamber 16 to chamber 71 in the event that the check valve 92 leaks, so that when the brake pipe pressure is reduced to effect an application of the brakes, only fluid from the chamber 71 can flow back to the brake pipe through the port 72, and the volume of the chamber 71 being small, the proper functioning of the apparatus in a service application of the brakes is not interfered with by flow of fluid under pressure into the brake pipe. Moreover, the above mentioned protection against leakage into chamber 71 protects against the valve 37 being held open longer than intended, because, obviously, if there is leakage into chamber 71, a longer time would be required to reduce the pressure of the fluid in said chamber, through the port 72, to an amount which would permit the diaphragm 45 to move to the right hand to normal position, so as to permit the valve 37 to be seated, than if the chamber 71 were tight against leakage.

When, with the triple valve parts in full service position, the auxiliary reservoir pressure in valve chamber 16 is reduced, by the flow of fluid therefrom to the brake cylinder, to substantially equal the reduced brake pipe pressure in the triple valve piston chamber 20, the triple valve piston 14 moves rearwardly, shifting the graduating valve 18 relative to the main slide valve 13 to service lap position, in which the graduating valve laps the service port 104, thus preventing the further flow of fluid under pressure from the auxiliary reservoir 2 to the brake cylinder.

It will be noted that there is no quick service venting of fluid under pressure from the brake pipe through the triple valve device after the initial reduction of the application, for the reason that the quick service port 106 remains lapped by the main slide valve 13 when said slide valve is in service position and that said slide valve remains in service position during the succeeding reductions of the application.

To effect the release of the brakes, the brake pipe pressure is increased in the usual manner. At the head end of the train, where this increase in brake pipe pressure will be at a fast rate, the triple valve parts will be shifted to retarded release position, as hereinbefore described, in which fluid under pressure is released from the brake cylinder 3 to the atmosphere at a retarded rate by way of pipe and passage 95, cavity 96 in the main slide valve 13, the restricted passage 100, the cavity 99, and passage 97. The auxiliary reservoir 2 is recharged with fluid at brake pipe pressure as in the initial charging.

On the cars at the rear end of the train, where the increase in brake pipe pressure, when releasing, is at a slower rate than on the cars at the head end of the train, the triple valve parts will be shifted to normal release position, as hereinbefore described, in which fluid under pressure is vented from the brake cylinder 3 to the atmosphere by way of the pipe and passage 95, cavity 96 in the main slide valve 13, and the atmospheric passage 97. The auxiliary reservoir 2 is recharged with fluid at brake pipe pressure as in the initial charging.

The chamber 71 in the combined quick service and quick action vent valve device is charged with fluid from the brake pipe as in the initial charging, hereinbefore described.

When it is desired to effect an emergency application of the brakes, a sudden reduction in brake pipe pressure is effected and this sudden reduction is effected in the chamber 44 at one side of the diaphragm 45. Since the port 72 in the diaphragm follower 73 will permit the flow of fluid from the chamber 71 at only a relatively slow rate, a fluid pressure differential is created on the diaphragm 45 which causes the diaphragm to move toward the left hand.

Owing to the more rapid rate at which fluid is vented from chamber 44 than is the case when the brake pipe pressure is reduced at a service rate, sufficient differential is created on opposite sides of the diaphragm 45 to cause said diaphragm to move toward the left hand against the resistance of both of the springs 39 and 66, as will now be described, until stopped by the engagement of the follower 73 with the end of the extended portion 86 of the pipe bracket.

As the diaphragm thus moves, the stem 88 on the diaphragm follower 73 first engages and unseats the valve 37 against the opposing pressure of the spring 39, and the unseating of this valve then causes the stem 42, through its engagement with the valve 37, to engage and unseat the valve 63 against the opposing pressure of the spring 66 acting through the medium of the follower 67. It will here be noted that as the valve 63 is unseated, it is slidably guided within the bore 64 in the piston stem 52.

When the valves 37 and 63 are thus unseated, fluid under pressure flows from the diaphragm chamber 44 to the quick action piston chamber 69 through the passage 90 in the diaphragm follower 73, the grooved passage 89 in the extended portion 86 of the pipe bracket 35, through passage 43, past the valve 37 into chamber 36, thence through the passage 68 and past the check valve 63. Fluid under pressure thus supplied to the chamber 69 causes the piston 51 to move toward the left hand, and said piston, through the medium of its stem 52, moves the quick action vent valve 53 from its seat rib 59, so that fluid under pressure is now vented from the brake pipe by way of brake pipe passage 25, passage 94, quick action vent valve chamber 55, past the open vent valve 53, passage 60, chamber 61 and the atmospheric opening 62. Fluid under pressure is also vented, at this time, from the piston chamber 69 past the unseated valve 63, through passage 68, chamber 36, past the unseated valve 37, through passages 43, 89, and 90, diaphragm chamber 44, passages 25 and 94, quick action vent valve chamber 55, past the open vent valve 53, passage 60, chamber 61 and the atmospheric opening 62.

It should here be understood, that the flow capacity of the restricted passage 47 is such that the rate of flow of fluid under pressure from chamber 36 into the quick service chamber 46 will have no appreciable effect upon the rate of built up of pressure in the piston chamber 69 and the quick action mechanism will, therefore, promptly function to propagate the emergency action throughout the length of the train.

Now, when fluid under pressure is substantially completely vented from the brake pipe and quick action chamber 55, the spring 58 acts to seat the vent valve 53 and the spring 66 acts to seat the valve 63. The spring 39, acting through the medium of the flange 41 on the stem 42, the valve 37 and the stem 88, moves the follower 73 toward the right hand, against the pressure of the light spring 85, to the position shown in Fig. 1. The spring 39 is assisted during this movement by the springs 58 and 66 until the valves 53 and 66 are seated.

The sudden reduction in brake pipe pressure effected by the aforementioned operation of the quick action mechanism being effective in the triple valve piston chamber 20, fluid at auxiliary reservoir pressure in valve chamber 16 causes the triple valve parts to move to emergency position, in which the piston 14 engages a gasket 111 interposed between the casing 7 and the cap 26, and in which an emergency port 112 in the main slide valve 13 registers with the brake cylinder passage 95, so that fluid under pressure is supplied from the auxiliary reservoir 2 to the brake cylinder 3 for applying the brakes.

With the piston 14 in emergency position, a passage 120 is uncovered by the main slide valve 13, thereby permitting flow of fluid from the auxiliary reservoir 2 to the piston chamber 109. The quick action piston 32 is then operated to unseat the vent valve 33. The pressure in chamber 108 being thereby instantly relieved, allows brake pipe fluid in chamber 23 to raise the check valve 34 and flow rapidly through chambers 108 and 110 to the brake cylinder, until brake cylinder and brake pipe pressures substantially equalize, when the check valve 34 is returned to its seat by the spring 113, preventing the pressure in the brake cylinder from flowing back into the brake pipe again. In this way a sudden local reduction of brake pipe pressure is effected, which acts to hasten the reduction in brake pipe pressure effected by the combined quick service and quick action vent valve device 5.

To effect a release of the brakes after an emergency application, the brake pipe is again charged with fluid under pressure, which causes the triple valve parts to move either to normal release position or to retarded release position, according to the rate of increase in brake pipe pressure. The auxiliary reservoir 2 is now charged with fluid under pressure from the brake pipe and fluid under pressure is released from the brake cylinder 3 in the same manner as in effecting a release of the brakes after a service application.

It will be noticed that there is a groove 113 in the casing 49 which connects the piston chamber 69 to the chamber 61, so that said piston chamber is open to the atmosphere when the piston 51 is in its normal position, as shown in the drawings. This is a leakage groove which will permit fluid, which may leak from the chamber 36 past the seated valve 63, to flow to the atmosphere, so that a pressure differential, due to such leakage, cannot be created, thus preventing unintentional operation of the piston 51 to open the quick action vent valve 53 and a consequent emergency application of the brakes.

The modified form of my invention shown in Fig. 2 differs from the form shown in Fig. 1, in that a restricted passage 123 and a relatively large passage 124 are provided through the diaphragm follower 73 through which the chamber 71 is adapted to be charged, the inner end of the passage 124 opening into an annular space 125 formed at the junction of the follower 73 and the stem 82, said space being normally open to chamber 71, as shown in Fig. 2. A gasket 121 having an annular seat rib 122 is preferably mounted on the end of the guide 84, said seat rib being adapted to be engaged by and effect a seal on the diaphragm follower 73 for closing off communication from chamber 125 to chamber 71.

According to the modification shown in Fig. 2, when in charging, brake pipe pressure in chamber 44 is increased at a slow rate, the diaphragm follower 73 will remain in the position shown in Fig. 2, in which chamber 71 is charged through the passages 123 and 124. When the brake pipe pressure in chamber 44 is increased at a fast rate, however, the diaphragm follower 73 will be moved toward the right hand until the follower engages the seat rib 122 and in so doing cuts off communication from chamber 125 to chamber 71. Under this condition, chamber 71 will be charged through the restricted passage 123 only and the rate of charging will, therefore, be slower than if both passages 123 and 124 were open to chamber 71, and this will tend to prevent chamber 71 from being overcharged.

It should be noted, that according to the modification shown in Fig. 2, chamber 71 is also adapted to be vented through the passages 123 and 124 when brake pipe pressure is reduced to effect an application of the brakes, the combined capacities of said passages being such that the pressure of the fluid in said chamber reduces at a slower rate than the pressure of brake pipe fluid in chamber 44, so that a fluid pressure differential is created on opposite sides of the diaphragm 45, which will cause said diaphragm to move toward the left hand and effect a local venting of fluid from the brake pipe, as hereinbefore described.

If it is desired that the combined quick service and quick action vent valve device 5 should control the quick service and quick action venting of brake pipe pressure without the assistance of the quick service and quick action venting, respectively, of brake pipe pressure as effected by the K triple valve device, as hereinbefore described, this may be accomplished by modifying said triple valve device as shown diagrammatically in Fig. 3, the remainder of the equipment being the same as is shown in Fig. 1.

In modifying the K triple valve device, the quick action mechanism is removed from the triple valve casing 7, leaving the chamber 109, which contained the quick action mechanism, open at one end. The old check valve casing 11, from which the check valve mechanism has been removed, is secured to the triple valve casing in its original position, there being a new element in the form of a plate 114 clamped between the triple valve casing and the check valve casing. The plate 114 fits in the check valve casing, which formerly accommodated the combined guide and valve seat member 115 of the quick action mechanism, and closes off the brake cylinder from the brake pipe by closing off the chamber 109, which is in communication with the brake cylinder, from the chamber 108, which is in communication with the brake pipe chamber 23.

For closing off the old quick service passage 106 from the chamber 108, a plug 116 is inserted in said passage where it connects with said chamber. A new passage 117 is provided for connecting the passage 106 to the pipe 12, through which fluid under pressure is adapted to equalize from the chamber 71 in the combined quick service and quick action vent valve device 5 into the valve chamber 16 when the main slide valve 13 is in retarded release position, the slide valve being modified in such a manner that the passage 106 will be open to the valve chamber 16 when said slide valve is in retarded release position. Thus, the passages 117 and 106 in the modified triple valve device perform the same functions as the passages 19 and 6 and the port 8 in the triple valve device shown in Fig. 1.

According to one feature of the invention, a plug 119 is inserted in passage 102 in the main slide valve 13, so as to prevent the venting of fluid under pressure from chamber 71 in the combined quick service and quick action vent valve device 5 into chamber 109 and thence into the brake cylinder 3 when the main slide valve 13 and the graduating valve are in quick service position, hereinbefore described. Venting of fluid under pressure at this time from chamber 71 to the brake cylinder, if permitted, would interfere with the proper operation of the combined quick service and quick action vent valve device.

With the exception of the above mentioned modifications, the triple valve device shown in Fig. 3 is similar to the triple valve device shown in Fig. 1.

It will thus be seen, according to the construction shown in Fig. 3, that when effecting a service application of the brakes, the quick service mechanism in the combined quick service and quick action vent valve device 5 operates alone to effect the initial local reduction in brake pipe pressure, because of the quick service feature in the K triple valve device being eliminated in the manner described. It will further be seen, that when effecting an emergency application of the brakes, the quick action mechanism in the combined quick service and quick action vent valve device 5 operates alone to effect a sudden venting of brake pipe pressure, because of the quick action feature being removed from the triple valve device, as hereinbefore described.

It will be understood from the foregoing description, that I have provided in a single structural unit an improved mechanism for locally venting fluid under pressure from the brake pipe for effecting a service application of the brakes and also for effecting an emergency application of the brakes. It will further be understood, that said mechanism may be associated with a triple valve device of the K type in which the usual quick service and quick action features are retained or may be associated with a triple valve device of the K type modified in such a manner that the quick service and quick action features have been eliminated.

Other fluid pressure brake equipments adapted to accomplish purposes similar to those accomplished herein but in a different manner, are shown and claimed in Patent 1,976,876 of Earle S. Cook, the copending application Serial No. 677,436 of Earle S. Cook and the applicant, and the copending applications Serial No. 677,435 and Serial No. 677,438 of Earle S. Cook, all of which were filed June 24, 1933 and which are assigned to the assignee of this application.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake equipment, the combination with a brake pipe and a brake controlling valve device operative upon a service rate of reduction in brake pipe pressure to effect a service application of the brakes and upon an emergency rate of reduction in brake pipe pressure to effect an emergency application of the brakes, of valve means comprising a movable abutment subject to the opposing pressures of the brake pipe and a chamber, a normally seated valve operable by said abutment upon a reduction in brake pipe pressure to locally vent fluid under pressure from the brake pipe to effect a service application of the brakes, a normally closed quick action vent valve device operative to locally vent fluid under pressure from the brake pipe to effect an emergency application of the brakes, a movable abutment operative by fluid under pressure from the brake pipe for actuating said quick action vent valve device, and a normally seated valve operable by said first mentioned abutment upon a sudden reduction in brake pipe pressure for supplying fluid under pressure for actuating the second mentioned abutment.

2. In a fluid pressure brake equipment, the combination with a brake pipe and a brake controlling valve device operative upon a service rate of reduction in brake pipe pressure to effect a service application of the brakes and upon an emergency rate of reduction in brake pipe pressure to effect an emergency application of the brakes, of valve means comprising a movable abutment subject to the opposing pressures of the brake pipe and a chamber, a normally seated valve operable by said abutment upon a reduction in brake pipe pressure to locally vent fluid under pressure from the brake pipe to effect a service application of the brakes, a normally closed quick action vent valve device operative to locally vent fluid under pressure from the brake pipe to effect an emergency application of the brakes, a movable abutment operative by fluid under pressure from the brake pipe for actuating said quick action vent valve device, a normally seated valve operative to supply fluid under pressure from the brake pipe for actuating the last mentioned abutment, and means interposed between said valves and normally spaced from the last mentioned valve and adapted to be operated by the first mentioned valve for unseating the second mentioned valve upon a sudden reduction in brake pipe pressure.

3. In a fluid pressure brake, the combination with a brake pipe, of valve means for venting fluid from the brake pipe, a movable abutment subject to the opposing pressures of the brake pipe and a chamber and operated upon a reduction in brake pipe pressure for operating said valve means, said abutment having a communication through which fluid is supplied from the brake pipe to said chamber at a restricted rate and having another communication through which fluid is supplied to the chamber at a more restricted rate, and means operative by said abutment upon a rapid rate of increase in brake pipe pressure for cutting off flow of fluid from the brake pipe to said chamber through the first mentioned communication.

4. In a fluid pressure brake, the combination with a brake pipe, of a brake pipe vent valve device comprising a casing, valve means operative to vent fluid from the brake pipe, a movable abutment subject to the opposing pressures of the brake pipe and a chamber adapted to be charged with fluid under pressure from the brake pipe and operated upon a reduction in brake pipe pressure for operating said valve means, said abutment having a communication through which said chamber is charged with fluid from the brake pipe at one rate and another communication through which said chamber is charged at a slower rate, a seat carried by said casing, and means carried by said abutment and adapted to engage said seat to cut off flow of fluid from the brake pipe to said chamber through the first mentioned communication, said abutment being operated upon a rapid rate of increase in brake pipe pressure to cause said means to engage said seat.

5. In a fluid pressure brake, the combination with a brake pipe, of a brake pipe vent valve device comprising a casing, valve means operative to vent fluid from the brake pipe, a movable abutment subject to the opposing pressures of the brake pipe and a chamber adapted to be charged with fluid under pressure from the brake pipe and operated upon a reduction in brake pipe pressure for operating said valve means, said abutment having a communication through which said chamber is charged with fluid from the brake pipe at one rate and another communication through which said chamber is charged at a slower rate, a seat carried by said casing, and means carried by said abutment and adapted to engage said seat to cut off flow of fluid from the brake pipe to said chamber through the first mentioned communication, said abutment being operated upon a rapid rate of increase in brake pipe pressure to cause said means to engage said seat, and means for moving said abutment from the seating position upon substantial equalization of the pressures in the brake pipe and said chamber.

6. In a fluid pressure brake equipment, the combination with a casing having a brake pipe supply chamber and a chamber adapted to receive fluid under pressure from said supply chamber, of a movable abutment subject to the opposing pressures of said chambers and movable to one position upon a certain rate of increase in said supply chamber and movable to another position upon a different rate of increase in said supply chamber, a communication through said abutment through which said receiving chamber is charged with fluid under pressure from the supply chamber at one rate in the first mentioned position and at another rate in the second mentioned position, a gasket for effecting a leak-proof seal between said abutment and casing and operative in the second mentioned position to close the communication through which fluid under pressure is supplied from the supply chamber to the receiving chamber in the first mentioned position, and means for operating said abutment to break said seal upon substantial equalization of pressures in said chambers.

7. In a fluid pressure brake, the combination with a brake pipe, of valve means for venting fluid from the brake pipe, a movable abutment subject to the opposing pressures of the brake pipe and a chamber and operated upon a reduction in brake pipe pressure for operating said valve means, said abutment having an always open communication through which fluid is supplied from the brake pipe to said chamber and having another communication through which fluid is supplied to said chamber, and means operated by said abutment for cutting off the flow of fluid from the brake pipe to said chamber through the second mentioned communication.

8. In a fluid pressure brake, the combination with a brake pipe, of valve means for venting fluid from the brake pipe, a movable abutment subject to the opposing pressures of the brake pipe and a chamber and operated upon a reduction in brake pipe pressure for operating said valve means, said abutment having two through passages through which fluid is supplied from the brake pipe to said chamber, and means operated by said abutment for cutting off the flow of fluid from the brake pipe to said chamber through one of said passages.

9. In a fluid pressure brake, the combination with a brake pipe, of valve means for venting fluid from the brake pipe, a movable abutment subject to the opposing pressures of the brake pipe and a chamber and operated upon a reduction in brake pipe pressure for operating said valve means, said abutment having a relatively large passage through which fluid is supplied from the brake pipe to said chamber and having a restricted passage through which fluid is supplied to said chamber, and means operated by said abutment for cutting off the flow of fluid from the brake pipe to said chamber through said relatively large passage.

10. In a fluid pressure brake, the combination with a brake pipe, of a brake pipe vent valve device comprising a casing, valve means operative to vent fluid from the brake pipe, a movable abutment subject to the opposing pressures of the brake pipe, and a chamber adapted to be charged with fluid under pressure from the brake pipe and operated upon a reduction in brake pipe pressure for operating said valve means, said abutment having an always open communication through which said chamber is charged with fluid from the brake pipe and another communication through which said chamber is charged, and a seat carried by said casing and adapted to be engaged by said abutment for cutting off the flow of fluid from the brake pipe to said chamber through the second mentioned communication, said abutment being operated upon a rapid rate of increase in brake pipe pressure to cause said means to engage said seat.

11. In a fluid pressure brake equipment, the combination with a brake pipe, of a brake pipe vent valve mechanism comprising a chamber always in communication with the brake pipe, another chamber, a quick service chamber, and a valve chamber adapted to be connected to the first mentioned chamber, a passage connecting said valve chamber to said quick service chamber, a choke in said passage, a normally seated valve in said valve chamber for controlling communication from the first mentioned chamber to said valve chamber, a normally closed quick action vent valve device operated by an increase in fluid pressure for venting fluid from the brake pipe, a normally seated valve for controlling communication from said valve chamber to said vent valve device and operative to supply fluid under pressure to said vent valve device, and a movable abutment subject to the opposing pressures in the two first mentioned chambers and operated in accordance with the rate of reduction in pressure in the first mentioned chamber to one position for unseating only the first mentioned valve and to another position for first unseating the first mentioned valve and then to unseat the second mentioned valve.

ELLERY R. FITCH.